(12) United States Patent
Konishi

(10) Patent No.: US 11,805,215 B2
(45) Date of Patent: Oct. 31, 2023

(54) IMAGE PROCESSING APPARATUS AND METHOD OF STORING SETTING HISTORY

(71) Applicant: SHARP KABUSHIKI KAISHA, Sakai (JP)

(72) Inventor: Toshiyuki Konishi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/895,621

(22) Filed: Aug. 25, 2022

(65) Prior Publication Data

US 2023/0072806 A1 Mar. 9, 2023

(30) Foreign Application Priority Data

Sep. 3, 2021 (JP) .................. 2021-143949

(51) Int. Cl.
*H04N 1/00* (2006.01)
(52) U.S. Cl.
CPC ... *H04N 1/0097* (2013.01); *H04N 2201/0094* (2013.01)
(58) Field of Classification Search
None
See application file for complete search history.

(56) References Cited

U.S. PATENT DOCUMENTS

| 2008/0204807 | A1* | 8/2008 | Nakatsuka | G06F 3/1273 358/1.16 |
| 2011/0090533 | A1* | 4/2011 | Shimizu | G06K 15/18 358/1.15 |
| 2016/0274838 | A1* | 9/2016 | Kurihara | H04N 1/00411 |
| 2020/0076970 | A1* | 3/2020 | Chiba | G06F 3/1273 |
| 2020/0209933 | A1* | 7/2020 | Shimamura | G06F 1/263 |
| 2022/0377203 | A1* | 11/2022 | Ebi | H04N 1/4406 |
| 2023/0171354 | A1* | 6/2023 | Koujiro | H04N 1/00482 358/1.16 |

FOREIGN PATENT DOCUMENTS

JP 2002-149382 A 5/2002
JP 2009225187 A * 10/2009

* cited by examiner

*Primary Examiner* — Henok Shiferaw
(74) *Attorney, Agent, or Firm* — ScienBiziP, P.C.

(57) ABSTRACT

An image processing apparatus including: a job executor which executes a job regarding image processing; a storage in which a setting history related to execution of the job is stored when the job is executed; and a controller which controls a storage timing to store the setting history, in which the controller decides on the storage timing on the basis of an execution condition for the job, thereby storing the setting history.

9 Claims, 18 Drawing Sheets

FIG. 3

| SETTING HISTORY | | | | |
|---|---|---|---|---|
| JOB ID | EXECUTION DATE AND TIME | JOB TYPE | DISPLAY SETTING VALUE | SETTING VALUE FILE NAME |
| 0099 | 2020/02/22 20:20 | COPY | TRAY: TRAY 1, DOCUMENT: SINGLE-SIDED → DOUBLE-SIDED, DENSITY: TEXT, ····· | 0099.config |
| 0098 | 2020/02/22 19:19 | Scan to E-mail | TRANSMISSION DESTINATION:sample@local, test@test.ne.jp, FORMAT: HIGHLY-COMPRESSED PDF, RESOLUTION:600x600dpi, FUNCTION: BLANK PAPER, ····· | 0098.config |
| 0097 | 2020/02/22 18:18 | FAX | TRANSMISSION DESTINATION: 0123456789, sample (CO., LTD.), TRANSMISSION SIZE: A3, DOCUMENT: DOUBLE-SIDED → SINGLE-SIDED, FUNCTION: TIME SPECIFICATION, ····· | 0097.config |
| 0096 | 2020/02/22 18:10 | Scan to SMB | TRANSMISSION DESTINATION:\\USERFOLDER\test, FORMAT:jpeg, FUNCTION: MIXED DOCUMENTS,····· | 0096.config |
| 0095 | 2020/02/12 09:01 | Scan to E-mail | TRANSMISSION DESTINATION:sample@local, FORMAT: ENCRYPTED PDF, FUNCTION: MIXED DOCUMENTS, BLANK SHEET SKIP,····· | 0095.config |
| 0094 | 2020/02/11 20:30 | COPY | TRAY: TRAY 1, DOCUMENT: SINGLE-SIDED → DOUBLE-SIDED, ····· | 0094.config |
| 0093 | 2020/02/11 20:24 | FAX | TRANSMISSION DESTINATION: 0123456789, sample (CO., LTD.), TRANSMISSION SIZE: A3, DOCUMENT: DOUBLE-SIDED → SINGLE-SIDED, FUNCTION: TIME SPECIFICATION, ····· | 0093.config |
| 0092 | 2020/02/11 20:20 | COPY | TRAY: TRAY 3, DOCUMENT: DOUBLE-SIDED → DOUBLE-SIDED, DENSITY: TEXT + PHOTOGRAPHIC PAPER PHOTO, ····· | 0092.config |
| 0091 | 2020/02/11 17:10 | Scan to SMB | TRANSMISSION DESTINATION:\\USERFOLDER\test, FORMAT:bmp, ····· | 0091.config |
| 0090 | 2020/02/11 13:20 | FAX | TRANSMISSION DESTINATION: 0987654321, TRANSMISSION SIZE: A4, DOCUMENT: SINGLE-SIDED → -SINGLE-SIDED, ····· | 0090.config |

FIG. 4

| JOB HISTORY INFORMATION | | | | |
|---|---|---|---|---|
| JOB ID | EXECUTION DATE AND TIME | JOB TYPE | USER NAME | STATUS |
| 0099 | 2020/02/22 20:20 | COPY | aaaaa | FINISHED |
| 0098 | 2020/02/22 19:19 | Scan to E-mail | aaaaa | FINISHED |
| 0097 | 2020/02/22 18:18 | FAX | aaaaa | FINISHED |
| 0096 | 2020/02/22 18:10 | Scan to SMB | aaaaa | FINISHED |
| 0095 | 2020/02/12 09:01 | Scan to E-mail | aaaaa | FINISHED |
| 0094 | 2020/02/11 20:30 | COPY | bbbbb | FINISHED |
| 0093 | 2020/02/11 20:24 | FAX | bbbbb | FINISHED |
| 0092 | 2020/02/11 20:20 | COPY | ccccc | FINISHED |
| 0091 | 2020/02/11 17:10 | Scan to SMB | aaaaa | FINISHED |
| 0090 | 2020/02/11 13:20 | FAX | | FINISHED |

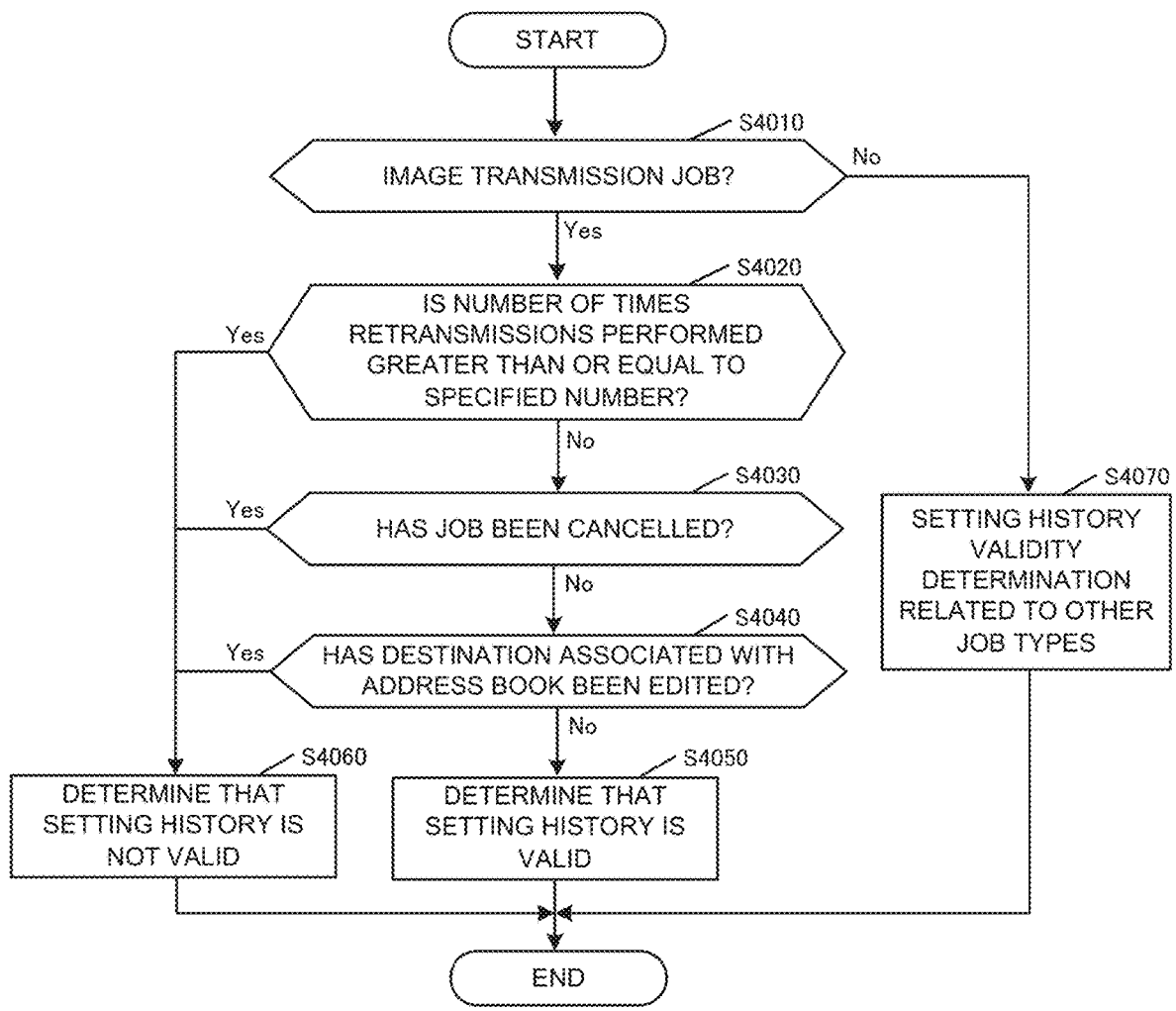

IMAGE PROCESSING APPARATUS AND METHOD OF STORING SETTING HISTORY

BACKGROUND OF THE INVENTION

Field of the Invention

The present disclosure relates to, for example, an image processing apparatus.

Description of the Background Art

Image processing apparatuses such as multifunction peripherals include ones that are related to execution of jobs such as printing, faxing, or image transmission, and store, as setting histories, setting values related to the execution of these jobs.

In recent years, attempts have been made to reduce the user's time and effort concerning execution of a job by use of the stored setting history. Specifically, the image processing apparatus displays a setting history on a display so that the setting history can be selected by the user. As the image processing apparatus which has received selection of a setting history by the user executes a job on the basis of setting values associated with the setting history, the job corresponding to the setting history can be easily reproduced.

Generally, the setting history is stored with an input of a job execution instruction, e.g., pressing of a start button, being a trigger. However, if the image processing apparatus is configured to simply store the setting history with the pressing of a start button being a trigger, depending on the type of a job and the settings, the setting history at a state of being in the middle of the execution may be stored. In this case, even if a job is executed using the relevant setting history, the job at the time of previous execution is not always faithfully reproduced.

In addition, in the setting history, all of the functions of the executed job are stored irrespective of a result of the execution of the job. For this reason, even in a case where the job is not completed normally due to occurrence of an error or job cancellation, etc., setting values related to the job are stored as the setting history. Even if a job is later executed using such a setting history, it is not possible to determine whether the job related to the setting history is normally completed or not. Therefore, in the case where the previous job failed, it is likely that the same failure will be repeated.

For example, there is disclosed a technology of using a first storage means for saving, when power interruption occurs during execution of a processing job, information regarding progress of the execution of the processing job, at the time of or after recovery of the power interruption, and transferring, from the first storage means, the information saved in the first storage means to a second storage means for storing and accumulating, as execution history information, information regarding a processing result of the processing job for which the execution has been completed.

According to the technology described above, the technology indicates that job history information of a job in the middle of execution that may be lost by a power interruption error can be reliably saved, and it is possible to prevent the accuracy of the job history information from being lowered.

However, in the conventional technology described above, the setting history is not stored by taking into account the type of a job and the settings. Therefore, if the setting history at a state of being in the middle of the execution is stored, it is possible that the setting history accurately reflecting the final state at the time of execution of the job may not be obtained.

An object of the present disclosure is to provide an image processing apparatus, for example, in which a timing to store a setting history is decided on the basis of the type of a job and the settings, whereby the setting history accurately reflecting the final state at the time of execution of the job can be obtained.

SUMMARY OF THE INVENTION

In order to solve the above problem, an image processing apparatus according to the present disclosure includes: a job executor which executes a job regarding image processing; a storage in which a setting history related to execution of the job is stored when the job is executed; and a controller which controls a storage timing to store the setting history, and is characterized in that the controller decides on the storage timing on the basis of an execution condition for the job, thereby storing the setting history.

Also, a method of storing a setting history according to the present disclosure includes: a storage step of storing a setting history related to execution of a job when the job is executed; and a control step of controlling a storage timing to store the setting history, and is characterized in that the control step decides on the storage timing on the basis of an execution condition for the job, thereby storing the setting history.

According to the present disclosure, it is possible to provide an image processing apparatus, for example, in which a timing to store a setting history is decided on the basis of the type of a job and the settings, whereby the setting history accurately reflecting the final state at the time of execution of the job can be obtained.

BRIEF DESCRIPTION OF THE DRAWINGS

FIG. 3 is a table illustrating a configuration example of a data structure of setting histories.

FIG. 4 is a table illustrating a configuration example of a data structure of job histories.

FIG. 18 is a flowchart illustrating a flow of processing according to the third embodiment.

DESCRIPTION OF THE PREFERRED EMBODIMENTS

Embodiments of the present disclosure will be described below with reference to the accompanying drawings. In the present disclosure, a multifunction peripheral that can perform, in a single body, jobs related to copying, faxing, image transmission, etc., will be described as one form of an image processing apparatus. The following embodiments are presented as examples for explaining the present disclosure, and the technical scope recited in the claims is not limited to that of the following description.

1. First Embodiment

1.1 Functional Configuration

Figure 1:
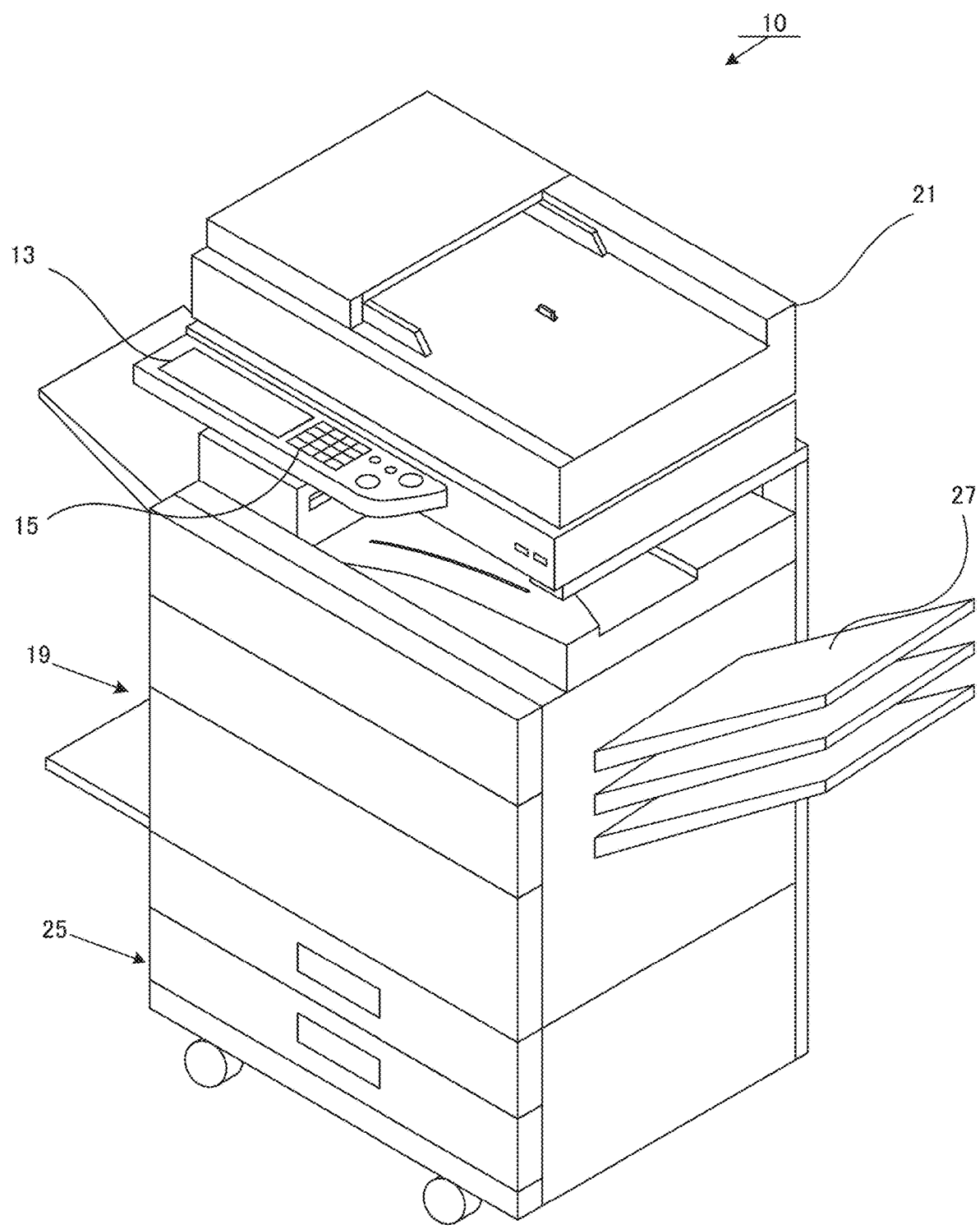
FIG. 1 is an external perspective view of a multifunction peripheral according to a first embodiment.
Figure 2:
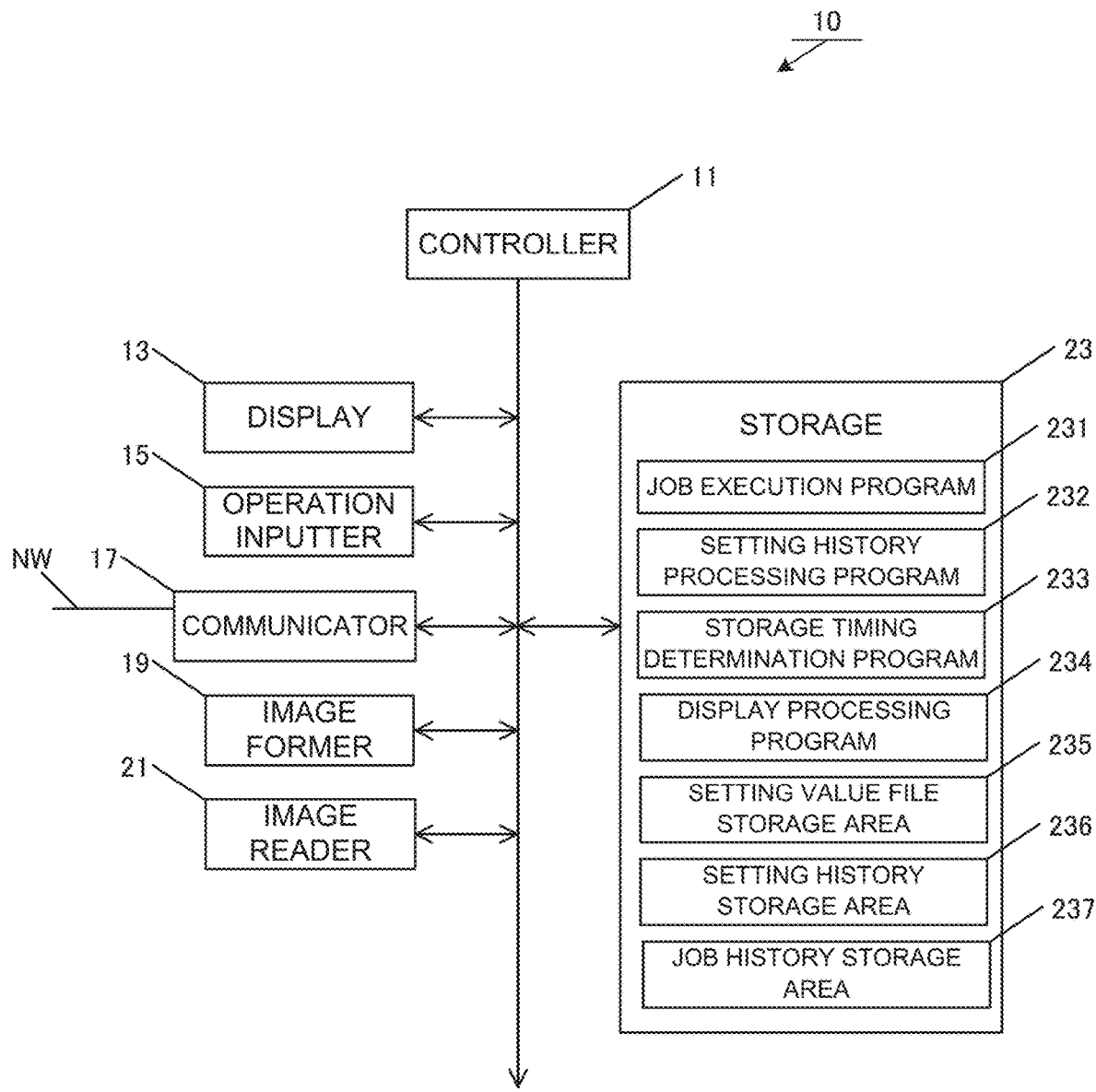
FIG. 2 is a functional configuration diagram of the multifunction peripheral according to the first embodiment.

A functional configuration of a multifunction peripheral 10 according to a first embodiment will be described with reference to FIGS. 1 and 2. FIG. 1 is an external perspective view which schematically illustrates an overall configuration of the multifunction peripheral 10. FIG. 2 is a functional configuration diagram of the multifunction peripheral 10. The multifunction peripheral 10 is provided with a controller 11, a display 13, an operation inputter 15, a communicator 17, an image former 19, an image reader 21, and a storage 23.

The controller 11 performs overall control of the multifunction peripheral 10. The controller 11 is configured from, for example, one or more arithmetic devices (such as central processing units [CPUs]). The controller 11 reads and executes various programs stored in the storage 23, thereby implementing the function.

The display 13 displays various kinds of information to a user, for example. The display 13 can be composed of, for example, a liquid crystal display (LCD) or an organic electro-luminescence (EL) display.

The operation inputter 15 receives input of information by the user, for example. The operation inputter 15 can be configured from, for example, a hardware key (e.g., a numeric keypad), buttons, and the like. The operation inputter 15 can be configured as a touch panel that allows input via the display 13. In this case, for example, typical methods such as a resistive method, an infrared method, an electromagnetic induction method, or a capacitive sensing method can be applied as an input method for the touch panel.

The communicator 17 is provided with either of or both of wired and wireless interfaces to communicate with other devices via a network (NW), such as a local area network (LAN), a wide area network (WAN), the Internet, a telephone line, or a fax line.

The image former 19 forms an image based on image data on paper, which is a recording medium. The image former 19 feeds paper from a paper feeder 25, forms an image based on the image data on the paper, and then discharges the paper to a paper discharge portion 27. The image former 19 can be configured from, for example, a laser printer using an electrophotographic method. In this case, the image former 19 performs image formation by using toners supplied from toner cartridges, which are not illustrated, corresponding to respective toner colors (e.g., cyan, magenta, yellow, and black).

The image reader 21 scans and reads a document image, thereby generating image data. The image reader 21 may be configured as a scanner device provided with an image sensor such as a charge-coupled device (CCD), a contact image sensor (CIS), or the like. As long as the image reader 21 is configured to generate the image data by reading, with an image sensor, a reflected light image from the document image, the configuration thereof is not limited.

The storage 23 stores therein various kinds of data and various programs necessary for operation of the multifunction peripheral 10. The storage 23 can be configured from, for example, storage devices such as a random-access memory (RAM), a hard disk drive (HDD), a solid state drive (SSD), and a read-only memory (ROM).

In the first embodiment, the storage 23 stores a job execution program 231, a setting history processing program 232, a storage timing determination program 233, and a display processing program 234, and reserves a setting value file storage area 235, a setting history storage area 236, and a job history storage area 237.

The job execution program 231 is a program that the controller 11 reads in order to perform processing associated with execution of each function, such as copying, faxing, and image data transmission, on a job-by-job basis. The controller 11 that has read the job execution program 231 executes a job by controlling the display 13, the operation inputter 15, the communicator 17, the image former 19, the image reader 21, and the like, which serve as job executors. Note that the controller 11 that has read the job execution program 231 can execute various jobs on the basis of setting values included in a setting value file concerning a setting history.

The setting history processing program 232 is a program that the controller 11 reads when, for example, acquisition of a setting value related to execution of a job, generation of a setting history, and various kinds of processing with respect to the setting history are to be performed. The controller 11 that has read the setting history processing program 232 acquires the setting value related to the execution of the job, and generates a setting value file in which the setting value is stored. Then, the controller 11 stores the generated setting value file in the setting value file storage area 235. In addition, the controller 11 generates a setting history by associating the setting value file with identification information (e.g., job ID) for identifying to which job the setting history is related. Further, the controller 11 stores the generated setting history in the setting history storage area 236.

The storage timing determination program 233 is a program that the controller 11 reads when determining a storage timing to store the generated setting history in the setting history storage area 236. The controller 11 that has read the storage timing determination program 233 decides on the storage timing to store the setting history on the basis of an execution condition for a job. For example, the controller 11 determines the storage timing to store the setting history on the basis of the job type and the settings, as the execution condition for a job. In the present disclosure, the storage timing is intended as a specific point in time of storing the generated setting history in the setting history storage area 236. However, the actual storage processing of storing the setting history may be performed, for example, at the same time as decision determination of a storage timing, at the same time as an input operation for an input means which has triggered the decision determination, or after a predetermined time (period) has elapsed from the decision determination or the input operation for the input means.

The display processing program 234 is a program that the controller 11 reads when displaying, on the display 13, a display screen that displays the setting histories as a list; a setting screen that receives input of various setting values related to execution of a job, an execution instruction, or an end instruction, for example; a basic screen (e.g., a home screen) that displays the setting screens in a switchable manner; or a login screen for user authentication, for example.

The setting value file storage area 235 is a storage area for storing the setting value file generated by the controller 11 that has read the setting history processing program 232. The setting values include, for example, setting values set by the user, such as a color mode, a resolution, a format, and a density, and setting values such as an apparatus default value held by the apparatus itself. The controller 11 that has read the job execution program 231 acquires the setting value file associated with the setting history, which is to be used for execution, from the setting value file storage area 235, and executes the job on the basis of the setting values included in the acquired setting value file.

The setting history storage area 236 is a storage area for storing the setting history generated by the controller 11 that has read the setting history processing program 232. The setting histories stored in the setting history storage area 236 are read as appropriate during list display processing or when a job based on the relevant setting history is to be executed.

The setting history related to the present disclosure will now be described. FIG. 3 is a table illustrating a configuration example of a data structure of the setting histories stored in the setting history storage area 236.

The setting histories exemplified in FIG. 3 include the job ID, execution date and time, job type, display setting values, and setting value file name.

The job ID corresponds to identification information for identifying which job the setting history relates to. The execution date and time indicates the date and time of job execution. The job type indicates the type of a job executed (e.g., a copy job, a fax job, an image transmission job, etc.). The display setting values indicate a part of the setting values (contents) to be displayed on the display screen which displays the setting histories as a list. The setting value file name corresponds to the file name of the setting value file associated with the relevant setting history.

For example, the setting history related to job ID "0099" indicates a setting history pertaining to a job whose job type is "Copy", which was executed at 20:20 on 2020/02/22. The job is a copy job executed on the basis of the setting values included in the setting value file that is named "0099.config", and represents an example in which the setting values (items) such as "Tray: Tray 1, Document: Single-sided→Double-sided, Density: Text, . . . " are set as the display setting values to be displayed on the display screen. Note that the display setting values set by each job ID are merely examples, and the setting values to be displayed on the display screen are not limited to those illustrated in FIG. 3.

Now back to FIG. 2 again, the job history storage area 237 is an area for storing a record of execution of a job as a job history. The job history related to the present disclosure will now be described. FIG. 4 is a table illustrating a configuration example of a data structure of the job histories stored in the job history storage area 237.

The job histories related to the examples illustrated in FIG. 4 include the job ID, execution date and time, job type, user name, and status.

The job ID, the execution date and time, and the job type are items that are the same as those included in the setting history illustrated in FIG. 3, and have the same contents as those of FIG. 3. The user name indicates the name of the user who has executed the relevant job. The status indicates the processing status of the relevant job.

For example, the job history related to job ID "0098" indicates a job history pertaining to a job whose job type is "Scan to E-mail", which was executed at 19:19 on 2020/02/22. Further, the job indicates that an instruction to execute a job was input by a user who has the user name "aaaaa", and the status of the job is "finished".

Unlike the setting history, since the job history is information which is a record on an execution history of a job, the job history can be generated immediately after completion of the job or after generation of the setting history.

1.2 Flow of Processing 1.2.1 Flow of Overall Processing

Figure 5:
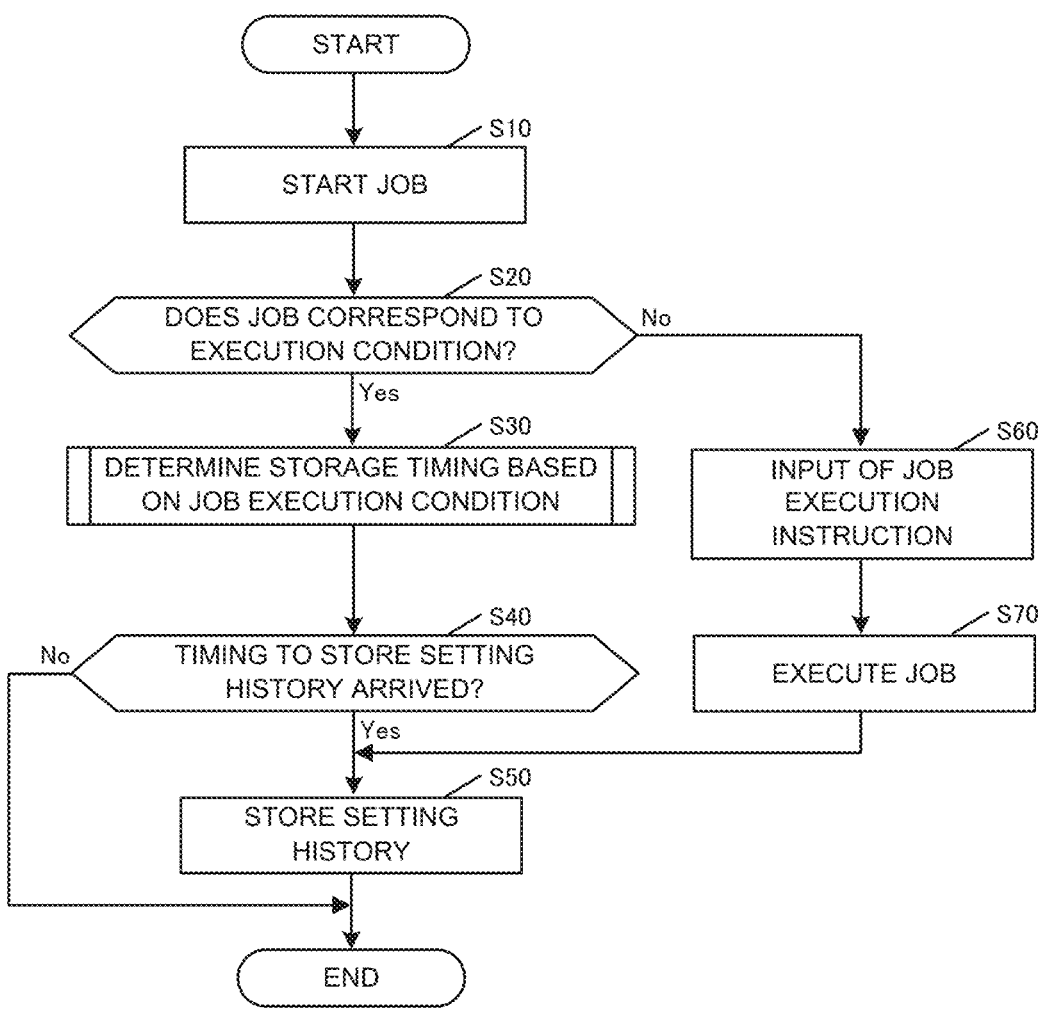
FIG. 5 is a flowchart illustrating a flow of processing according to the first embodiment.

Next, a flow of processing according to the first embodiment will be described. FIG. 5 is a flowchart illustrating overall processing performed by the multifunction peripheral 10. The processing described herein is processing executed by the controller 11 as the controller 11 reads the job execution program 231, the setting history processing program 232, the storage timing determination program 233, and the display processing program 234.

For example, when a job is started with display of a setting screen, etc., related to execution of a job being a trigger, the controller 11 determines whether the job to be started is a job corresponding to the execution condition (step S10→step S20).

In the first embodiment, as the jobs corresponding to the execution condition, the following three types of jobs:

(1) Job for which an input of a job end instruction is made after an input of a job execution instruction;

(2) Job for which an input of a second job execution instruction is made after an input of a first job execution instruction; and (3) Job for which an input of a second job confirming instruction is made between an input of a first job execution instruction and an input of a second job execution instruction are described. The specific modes of these jobs will be described later.

If the job to be started corresponds to the above type, the controller 11 executes storage timing determination processing based on the job execution condition (step S20; Yes→step S30).

In step S40, the controller 11 determines whether a storage timing to store the setting history has arrived, and if it is determined that the storage timing to store the setting history has arrived, the controller 11 stores the relevant setting history in the setting history storage area 236 and ends the processing (step S40; Yes→step S50→"End").

Meanwhile, in step S40, if it is determined by the controller 11 that the storage timing to store the setting history has not arrived yet, the controller 11 ends the processing without storing the setting history in the setting history storage area 236 (step S40; No→"End").

Incidentally, if it is determined by the controller 11 that the job to be started does not correspond to the above type, the controller 11 receives an input of an instruction to execute the job (step S20; No→step S60). Next, the controller 11 stores, after executing the job, the setting history related the executed job in the setting history storage area 236, and ends the processing (step S70→step S50→"End").

Note that the setting history is generated by the controller 11 that has read the setting history processing program 232, as described above. In the case of the first embodiment, the controller 11 may adopt a mode of generating the setting history according to the storage timing to store the setting history. Alternatively, the controller 11 may adopt a mode of generating the setting history at the time of job execution, and discarding the generated setting history when the storage timing to store the setting history has not arrived yet.

1.2.2 Flow of Storage Timing Determination Processing

Next, processing related to step S30 of FIG. 5 will be described for each type of the job corresponding to the execution condition. In each of the steps described below, the same step code is assigned to the same processing.

Figure 6:
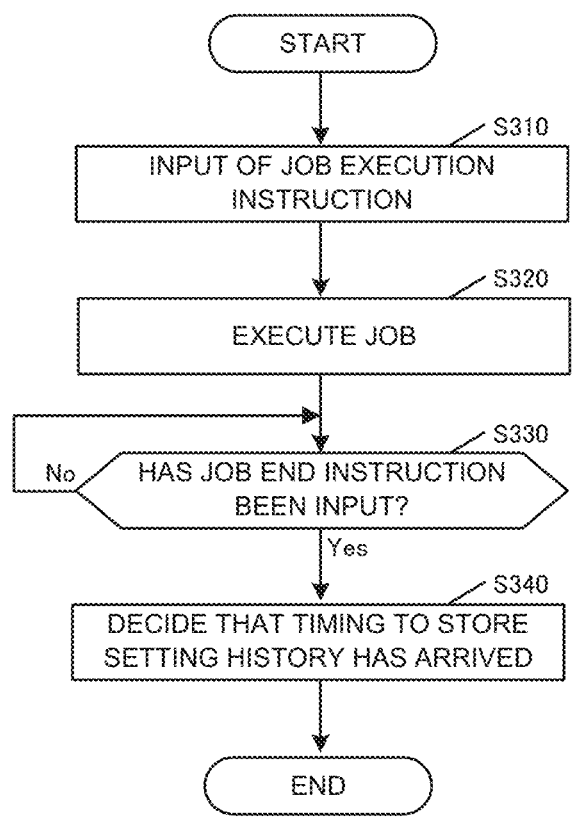
FIG. 6 is a flowchart illustrating a flow of processing according to the first embodiment.

FIG. 6 is a flowchart illustrating processing related to (1), i.e., a job for which an input of a job end instruction is made after input of a job execution instruction.

When the controller 11 receives an input of an instruction to execute a job, the controller 11 executes the job (step S310→step S320).

Next, the controller 11 determines whether an instruction to end the job has been input (step S330).

If it is determined by the controller 11 that an instruction to end the job has been input, the controller 11 decides that the storage timing to store the setting history has arrived, and ends the processing (step S330; Yes→step S340→"End").

Meanwhile, if it is determined by the controller 11 that no instruction to end the job has been input, the controller 11 does not decide that the storage timing to store the setting history has arrived, but waits until an instruction to end the job is input (step S330; No).

Figure 7:
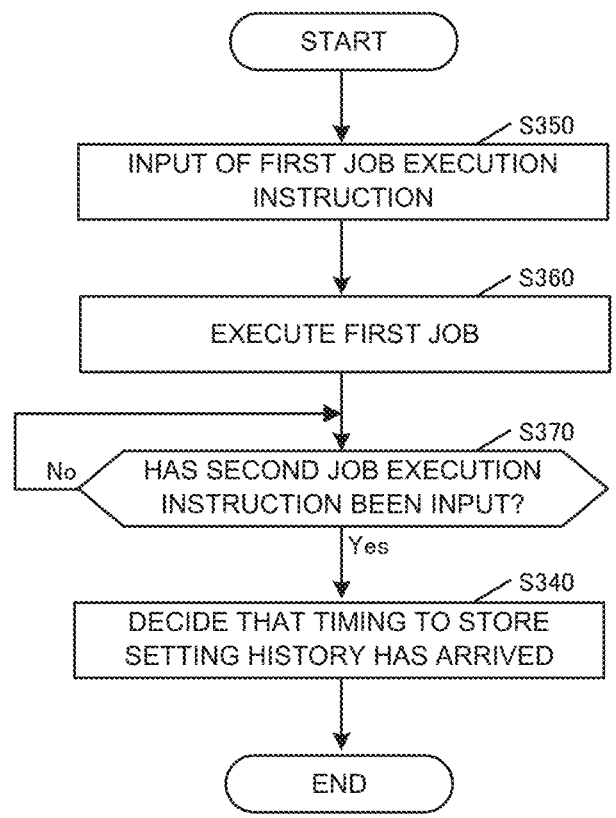
FIG. 7 is a flowchart illustrating a flow of processing according to the first embodiment.

FIG. 7 is a flowchart illustrating processing related to (2), i.e., a job for which an input of a second job execution instruction is made after an input of a first job execution instruction.

When the controller 11 receives an input of an instruction to execute a first job, the controller 11 executes the first job (step S350→step S360).

Next, the controller 11 determines whether an instruction to execute a second job has been input (step S370).

If it is determined by the controller 11 that an instruction to execute the second job has been input, the controller 11 decides that the storage timing to store the setting history has arrived, and ends the processing (step S370; Yes→step S340→"End").

Meanwhile, if it is determined by the controller 11 that no instruction to execute the second job has been input, the controller 11 does not decide that the storage timing to store the setting history has arrived, but waits until an instruction to execute the second job is input (step S370; No).

Figure 8:
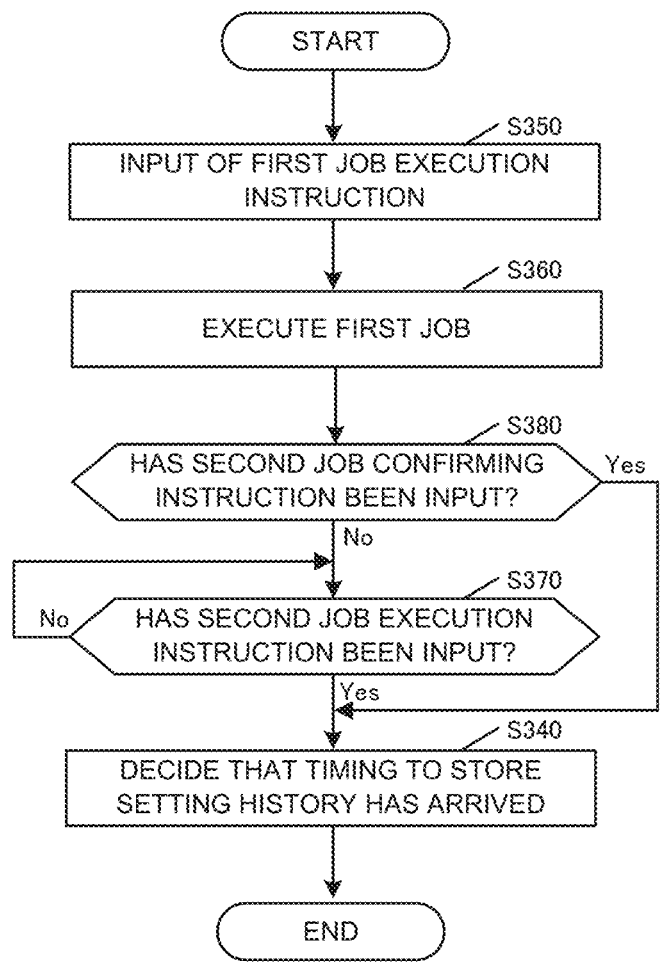
FIG. 8 is a flowchart illustrating a flow of processing according to the first embodiment.

FIG. 8 is a flowchart illustrating processing related to (3), i.e., a job for which an input of a second job confirming instruction is made between an input of a first job execution instruction and an input of a second job execution instruction.

When the controller 11 receives an input of an instruction to execute a first job, the controller 11 executes the first job (step S350→step S360).

Next, the controller 11 determines, before an input of a second job execution instruction is made, whether an instruction to confirm a second job, such as transmission reservation, has been input (step S380).

If it is determined by the controller 11 that a second job confirming instruction has been input, the controller 11 decides that the storage timing to store the setting history has arrived (step S380; Yes→step S340).

Meanwhile, if it is determined by the controller 11 that no instruction to confirm the second job has been input, in other words, no transmission reservation, etc., has been made, the controller 11 determines whether an instruction to execute the second job has been input (step S380; No→step 370).

If it is determined by the controller 11 that an instruction to execute the second job has been input, the controller 11 decides that the storage timing to store the setting history has arrived, and ends the processing (step S370; Yes→step S340→"End").

Meanwhile, if it is determined by the controller 11 that no instruction to execute the second job has been input, the controller 11 does not decide that the storage timing to store the setting history has arrived, but waits until an instruction to execute the second job is input (step S370; No).

1.3 Operation Example

Figure 9:
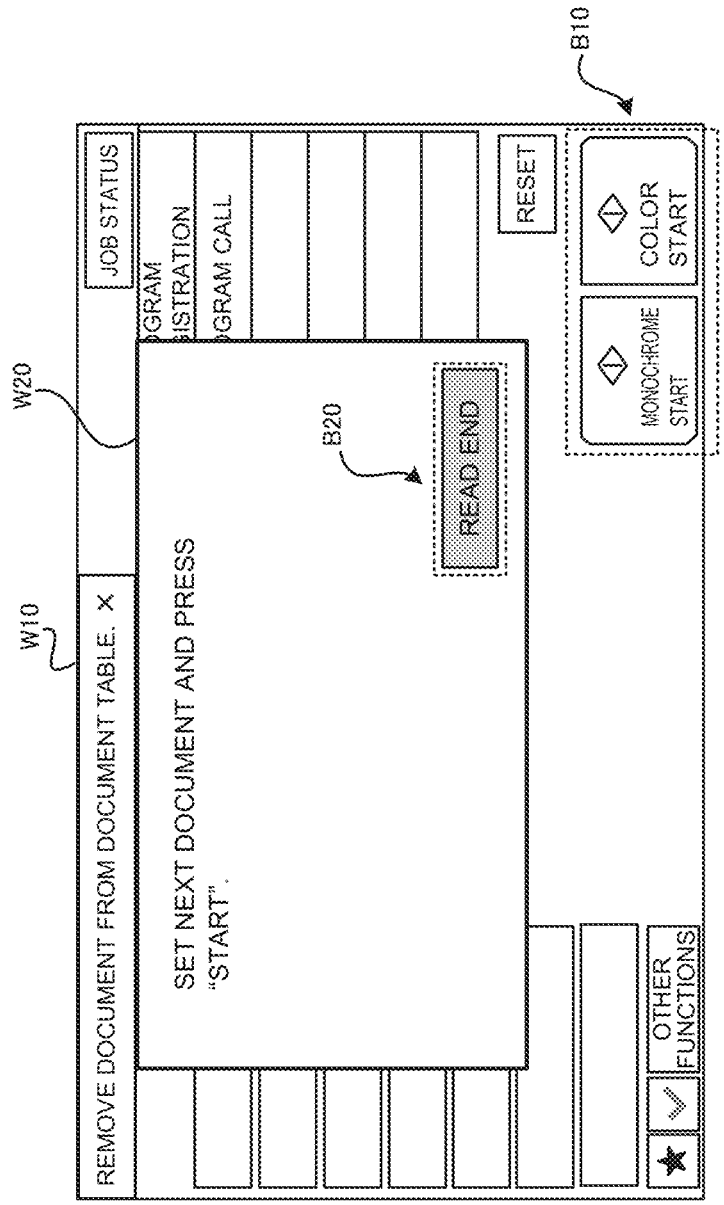
FIG. 9 is a diagram illustrating an operation example according to the first embodiment.

Next, an operation example according to the first embodiment will be described. FIG. 9 shows an operation example corresponding to the processing related to (1), i.e., a job for which an input of a job end instruction is made after an input of a job execution instruction. Examples corresponding to the above type include, for instance, a copy job of reading, from a document table provided in a scanner device that is applied as the image reader 21, a document image on the basis of an instruction to start reading a document, and forming an image on paper on the basis of an instruction to end reading the document.

A copy setting screen W10 of FIG. 9 includes a start button B10, and a read operation notification screen W20. The start button B10 is an input button which receives an input of an execution instruction to start reading a document that is set on a document table. For example, when a plurality of documents are to be read from the document table, the user presses the start button B10 every time he/she makes each one the documents read.

When reading of all documents is complete, the user presses a read end button B20, which receives an input of an instruction to end a job, provided on the read operation notification screen W20. Upon receiving the pressing of the read end button B20, the controller 11 ends the document read, and executes a copy job based on the read document image. In this case, the controller 11 decides that the pressing of the read end button B20 corresponds to the storage timing to store the setting history, and stores the relevant setting history.

Figure 10:
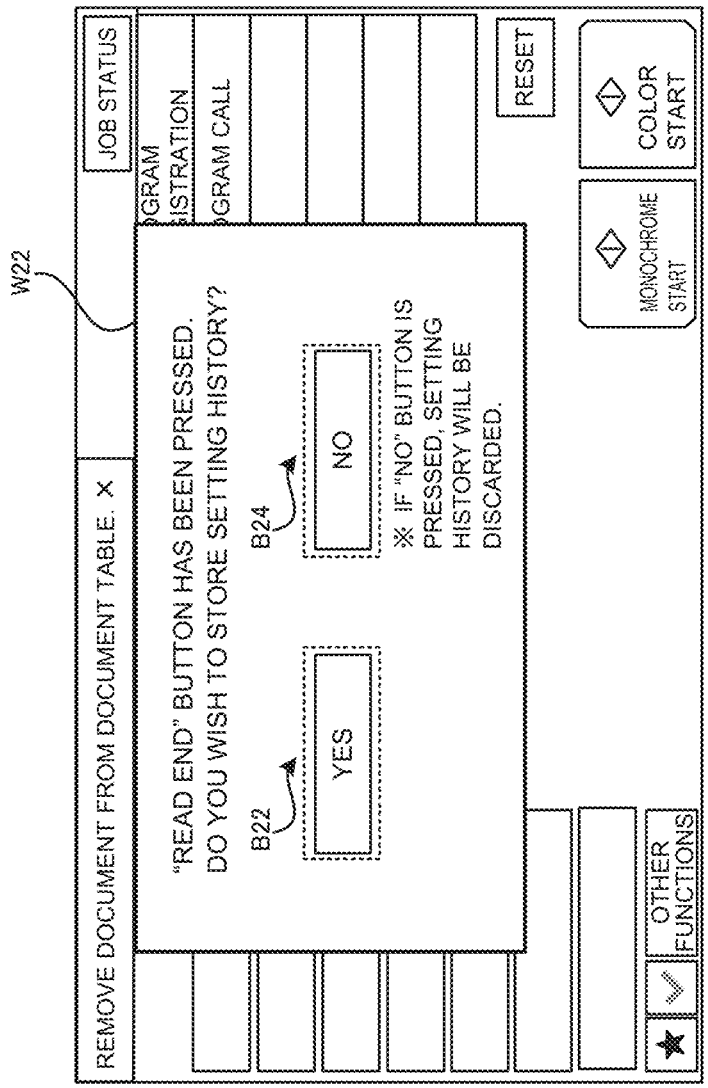
FIG. 10 is a diagram illustrating an operation example according to the first embodiment.

At this time, the controller 11 may display a setting history storage confirmation screen W22 exemplified in FIG. 10. The setting history storage confirmation screen W22 can be displayed when the pressing of the read end button B20 by the user is received. The setting history storage confirmation screen W22 displays, for example, a message such as "Read End button is pressed. Do you want to store setting history?" asking whether or not the setting history should be stored. Together with the display of such a message, the setting history storage confirmation screen W22 also displays a Yes button B22 whereby the storage of the setting history is "enabled", and a No button B24 whereby the storage of the setting history is "disabled". As the user selects and presses a desired button, whether or not the setting history should be stored can be selected.

Incidentally, when the read setting is double-sided read setting, the setting is not changed in the middle of a document read. Therefore, the controller 11 decides that the pressing of the start button B10 should be applied as the storage timing to store the setting history.

Figure 11A:
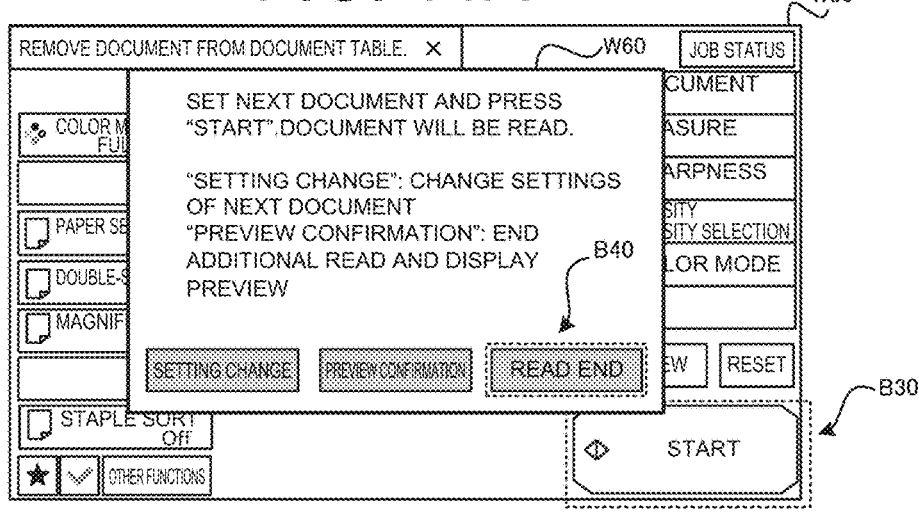
FIGS. 11A to 11C are each a diagram illustrating an operation example according to the first embodiment.
Figure 11B:
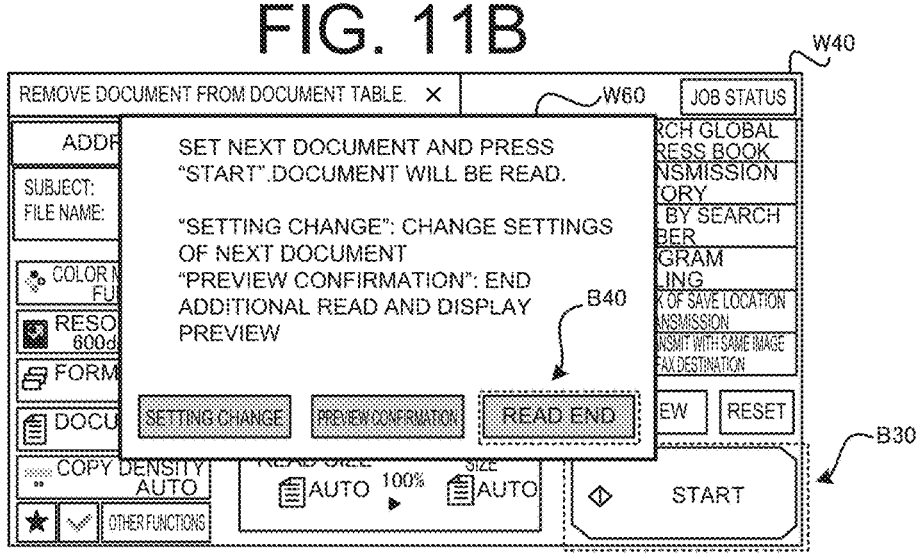
Figure 11C:
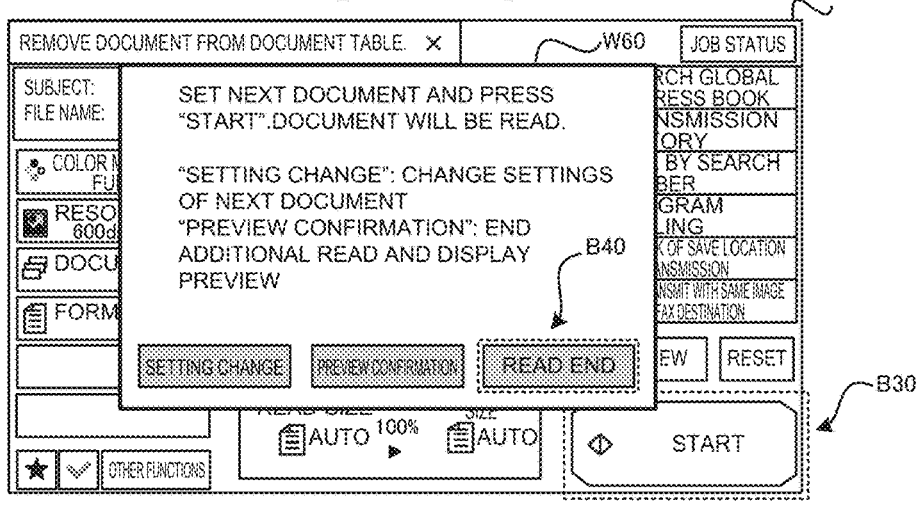

FIGS. 11A to 11C show operation examples corresponding to the processing related to (2), i.e., a job for which an input of a second job execution instruction is made after an input of a first job execution instruction. Examples corresponding to the above type include, for instance, a job in which a mass document mode which uses a scanner device that is applied as the image reader 21 is set. As examples of the present operation, a case in which the first job is set as a read of mass documents, and the second job is set as one of copying as image formation, image transmission as transmission of an image, and image saving as a save of an image will be described.

A copy setting screen W30 of FIG. 11A includes a start button B30, and a read operation notification screen W60. The start button B30 is an input button which receives, as the first job, an input of an execution instruction to start reading a document that is set on the image reader 21. As the user sets, for example, a part of mass documents on an automatic document feeder provided in the scanner device that is applied as the image reader 21, and presses the start button B30, a document read is started.

When reading of all documents is complete, the user presses a read end button B40, which receives an input of a second job execution instruction, provided on the read operation notification screen W60. Upon receiving the pressing of the read end button B40, the controller 11 ends the document read, and executes a copy job based on the read document image. In this case, the controller 11 decides that the pressing of the read end button B40 corresponds to the storage timing to store the setting history, and stores the relevant setting history.

An image transmission setting screen W40 of FIG. 11B includes the start button B30 and the read operation notification screen W60. The start button B30 is an input button which receives, as the first job, an input of an execution instruction to start reading a document that is set on the image reader 21. As the user sets, for example, a part of mass documents on an automatic document feeder provided in the scanner device that is applied as the image reader 21, and presses the start button B30, a document read is started.

When reading of all documents is complete, the user presses the read end button B40, which receives an input of the second job execution instruction, provided on the read operation notification screen W60. Upon receiving the pressing of the read end button B40, the controller 11 ends the document read, and executes an image transmission job based on the read document image. In this case, the controller 11 decides that the pressing of the read end button B40 corresponds to the storage timing to store the setting history, and stores the relevant setting history.

An image save setting screen W50 of FIG. 11C includes the start button B30, and the read operation notification screen W60. The start button B30 is an input button which receives, as the first job, an input of an execution instruction to start reading a document that is set on the image reader 21. As the user sets, for example, a part of mass documents on an automatic document feeder provided in the scanner device that is applied as the image reader 21, and presses the start button B30, a document read is started.

When reading of all documents is complete, the user presses the read end button B40, which receives an input of the second job execution instruction, provided on the read operation notification screen W60. Upon receiving the pressing of the read end button B40, the controller 11 ends the document read, and executes an image save job based on the read document image. In this case, the controller 11 decides that the pressing of the read end button B40 corresponds to the storage timing to store the setting history, and stores the relevant setting history.

Figure 12A:
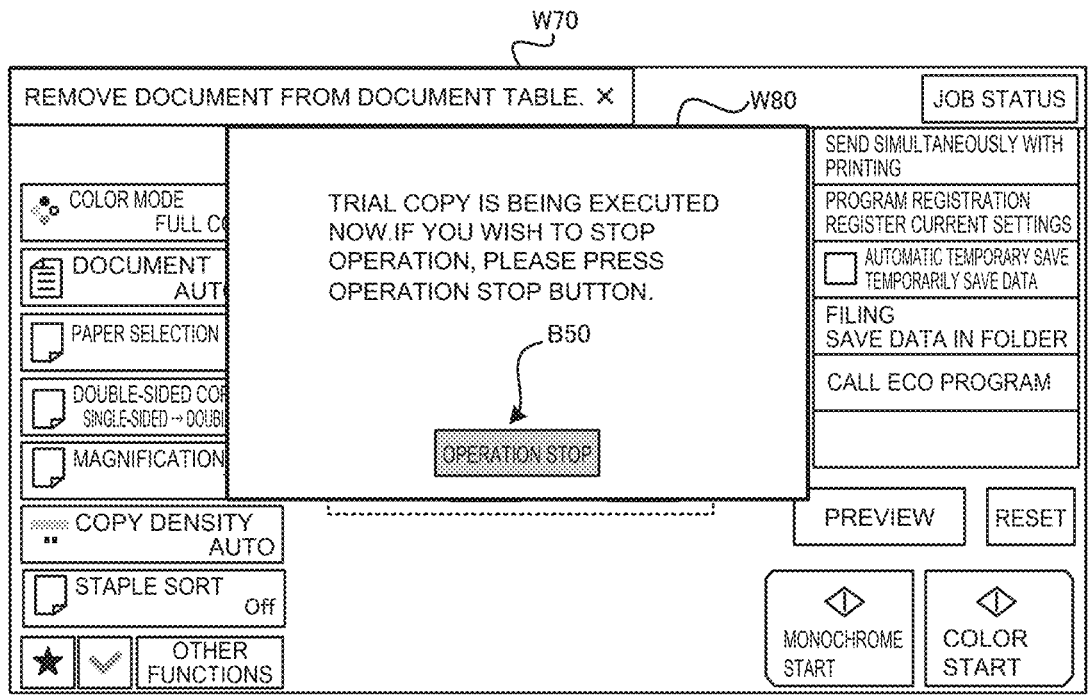
FIGS. 12A and 12B are each a diagram illustrating an operation example according to the first embodiment.
Figure 12B:
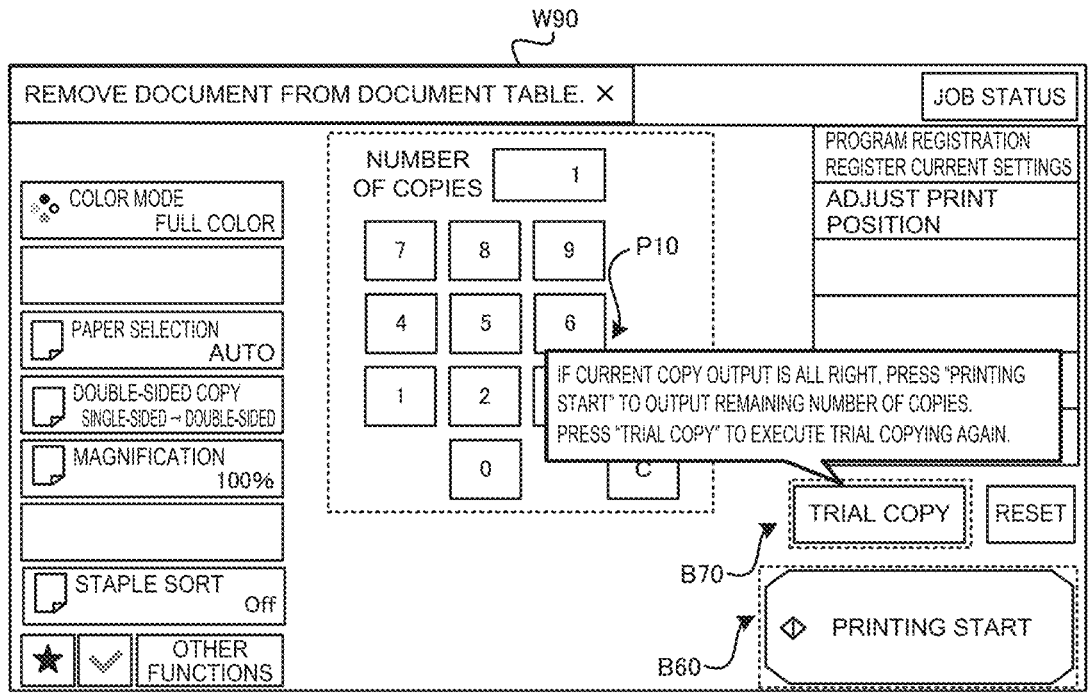

FIGS. 12A and 12B show an operation example of a job in which trial copying is set, as another example that is different from the job in which the mass document mode is set. In the present operation example, a mode in which the first job is trial copying, which is a tentative operation of copying as the second job, will be described.

FIG. 12A illustrates a configuration example of an execution screen W70 of trial copying as the first job. The execution screen W70 includes a status notification screen W80 which notifies that the multifunction peripheral 10 is performing trial copying. Note that when the user wishes to stop the trial copying, he/she can press an operation stop button B50 provided on the status notification screen W80 to stop the trial copying.

FIG. 12B illustrates a configuration example of a printing start reception screen W90 that is displayed after execution of the trial copying. The printing start reception screen W90 is a screen to receive an input of an execution instruction for copying as the second job. When the user has confirmed the contents of a message displayed on a pop-up screen P10, and determines that the current copy settings present no problem, he/she can press a printing start button B60, thereby inputting an execution instruction for the second job.

Meanwhile, if the user wishes to perform the trial copying again, he/she can press a trial copy button B70, thereby executing the trial copying.

The controller 11 decides that the pressing of the printing start button B60 by the user corresponds to the storage timing to store the setting history, and stores all of the setting histories including the trial copying.

Figure 13:
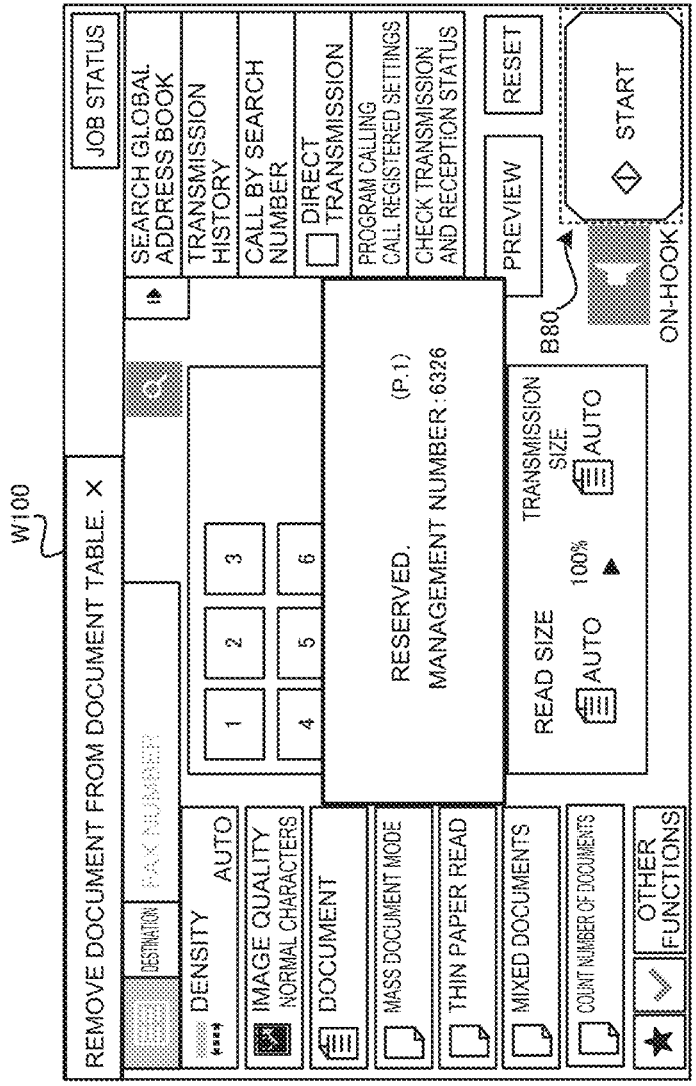
FIG. 13 is a diagram illustrating an operation example according to the first embodiment.

FIG. 13 shows an operation example corresponding the processing related to (3), i.e., a job for which an input of a second job confirming instruction is made between an input of a first job execution instruction and an input of a second job execution instruction. Examples corresponding to the above type include, for instance, a transmission reservation job of reading a document by using a scanner device that is applied as the image reader 21, and transmitting the relevant scan data by fax at the reserved time. As an example of the present operation, a case in which the first job is assumed as a document read, and the second job is assumed as fax transmission to be made at a reservation time will be described.

FIG. 13 illustrates a configuration example of a reservation confirmation screen W100 that is displayed immediately after pressing of a start button B80 to confirm transmission reservation, which serves as an input of a second job confirming instruction, and for which a document read has been performed as the first job. The controller 11 decides that the pressing of the start button B80 corresponds to the storage timing to store the setting history. Then, the controller 11 executes the fax transmission as the second job at the reservation time confirmed by the pressing of the start button B80.

As described above, according to the first embodiment, since a timing to store the setting history is decided on the basis of the type of a job and the settings, a setting history accurately reflecting the final state at the time of execution of the job can be obtained. By this feature, it is possible to reproduce a job based on the relevant setting history with high accuracy.

2. Second Embodiment

A second embodiment relates to (2), i.e., a job for which an input of a second job execution instruction is made after an input of a first job execution instruction, as has been described with reference to, for example, FIG. 7 of the first embodiment. The second embodiment adopts a mode of storing a setting history each time the first job is executed, and deciding that an input of the second job execution instruction in conjunction with the setting history should be applied as a storage timing to store the setting history.

2.1 Functional Configuration

A functional configuration of a multifunction peripheral according to a second embodiment can be made substantially the same as the configuration of the multifunction peripheral 10 according to the first embodiment. Therefore, the same configuration as that of the multifunction peripheral 10 according to the first embodiment is denoted by the same reference numeral, and the description thereof is omitted.

2.2 Flow of Processing

Figure 14:
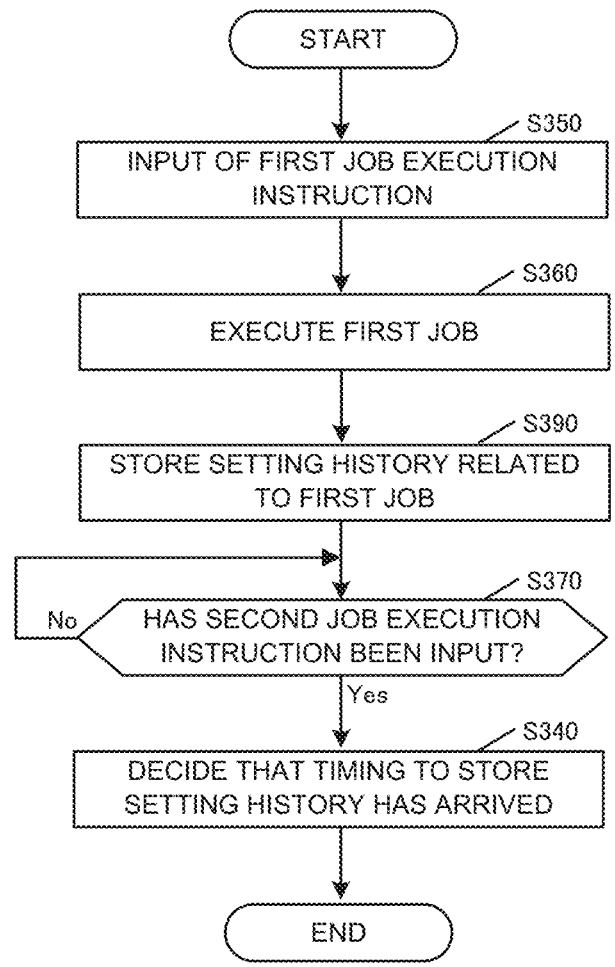
FIG. 14 is a flowchart illustrating a flow of processing according to a second embodiment.

FIG. 14 is a flowchart illustrating a flow of processing according to the second embodiment. The second embodiment is an embodiment in which processing related to step S390 is provided between the processing of step S360 and the processing of step S370 pertaining to the flowchart of FIG. 7. Since the other processing can be made the same as the processing described with reference to the flowchart of FIG. 7, the description thereof is omitted here.

When the controller 11 executes a first job, the controller 11 stores a setting history related to the first job (step S360→step S390).

Next, the controller 11 determines whether an instruction to execute a second job has been input (step S370).

If it is determined by the controller 11 that an instruction to execute the second job has been input, the controller 11 decides that a storage timing to store the setting history has arrived, and ends the processing (step S370; Yes→step S340→"End").

Meanwhile, if it is determined by the controller 11 that no instruction to execute the second job has been input, the controller 11 does not decide that the storage timing to store the setting history has arrived, but waits until an instruction to execute the second job is input (step S370; No).

2.3 Operation Example

Next, an operation example according to the second embodiment will be described. In the operation example described with reference to FIG. 15, a mode in which the first job is trial copying, which is a tentative operation of copying as the second job, will be described, as in the operation example described with reference to FIGS. 12A and 12B.

Figure 15:
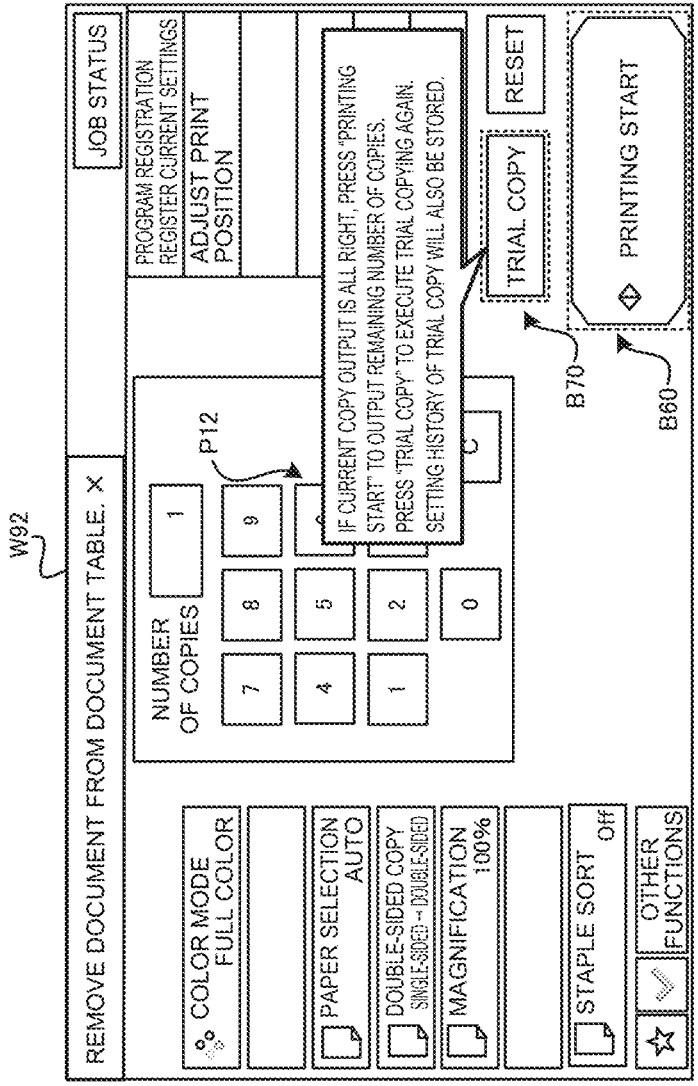
FIG. 15 is a diagram illustrating an operation example according to the second embodiment.

FIG. 15 illustrates a configuration example of a printing start reception screen W92 that is displayed after execution of trial copying. The printing start reception screen W92 is a screen to receive an input of an execution instruction for copying as the second job. In the second embodiment, a pop-up screen P12 to be confirmed by the user displays that the setting history is stored each time the trial copying as the first job is executed.

When the user has confirmed the contents of a message displayed on the pop-up screen P12, and determines that the current copy settings present no problem, he/she can press a printing start button B60, thereby inputting an execution instruction for the second job.

Meanwhile, if the user wishes to perform the trial copying again, he/she can press a trial copy button B70, thereby executing the trial copying. In this case, the controller 11 stores the setting history related to the executed trial copying.

As described above, according to the configuration of the second embodiment, advantages in addition to those of the first embodiment can be obtained. That is, since the second embodiment is configured to store a setting history each time the first job is executed, and decide that an input of the second job execution instruction in conjunction with the setting history should be applied as a storage timing to store the setting history, it is possible to acquire the setting histories at an intermediate stage without omission.

3. Third Embodiment

A third embodiment adopts a mode of determining, in a setting history stored in the first embodiment or the second embodiment, whether the setting history is valid after a job has been executed, and performing, when the stored setting history is not valid, editing/deletion processing for the setting history.

3.1 Functional Configuration

A functional configuration of a multifunction peripheral 30 according to a third embodiment can be made substantially the same as the configuration of the multifunction peripheral 10 according to the first embodiment. Therefore, the same configuration as that of the multifunction peripheral 10 according to the first embodiment is denoted by the same reference numeral, omitting explanation of the same configuration, and only the parts that are different are described.

Figure 16:
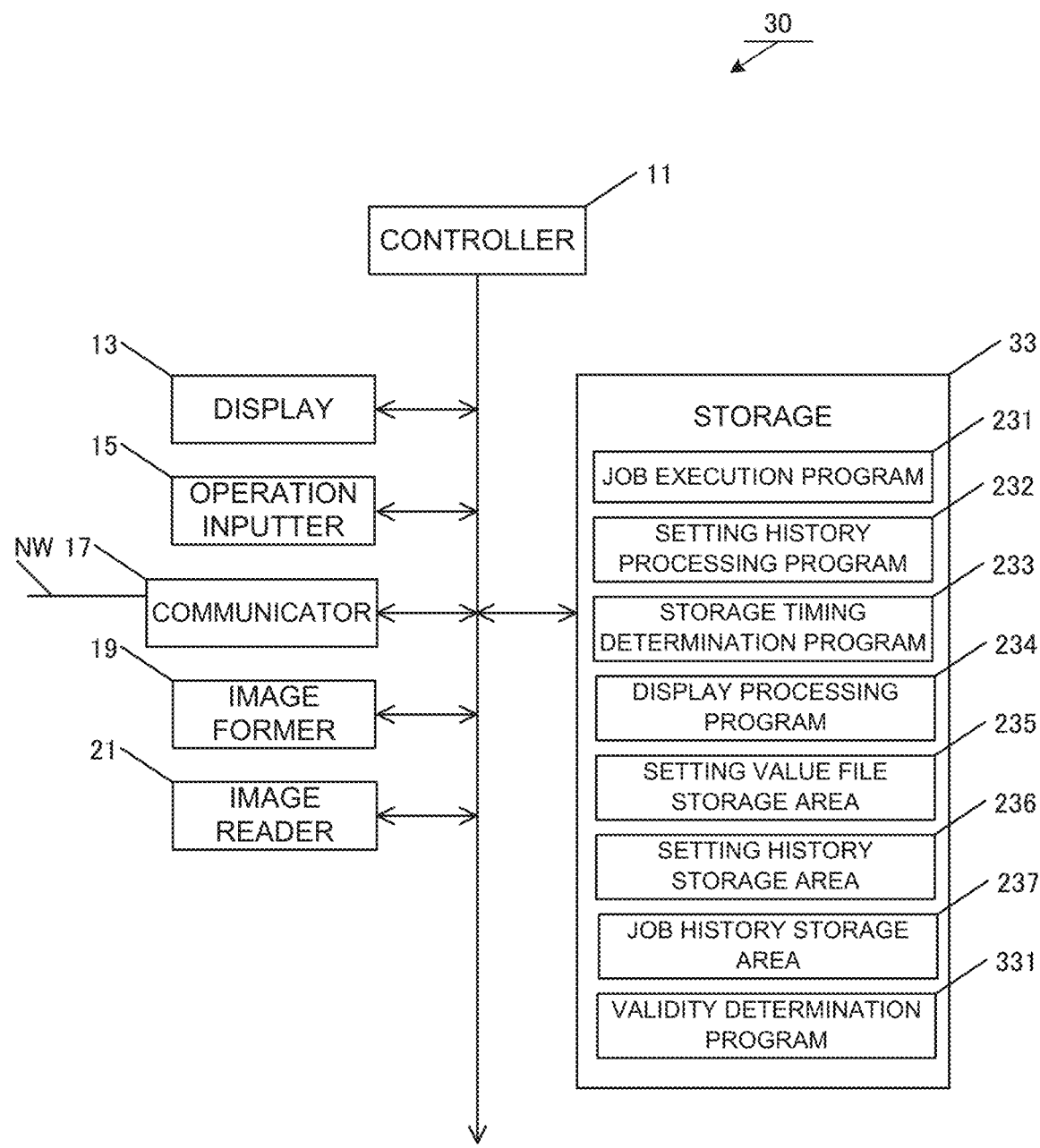
FIG. 16 is a functional configuration diagram of a multifunction peripheral according to a third embodiment.

FIG. 16 is a functional configuration diagram of the multifunction peripheral 30 according to the third embodiment. The multifunction peripheral 30 is provided with a storage 33, instead of the storage 23 provided in the multifunction peripheral 10.

In the third embodiment, the storage 33 stores a job execution program 231, a setting history processing program 232, a storage timing determination program 233, a display processing program 234, and a validity determination program 331, and reserves a setting value file storage area 235, a setting history storage area 236, and a job history storage area 237.

The validity determination program 331 is a program that a controller 11 reads after executing a job. The controller 11 that has read the validity determination program 331 determines validity of the setting history stored in the setting history storage area 236, on the basis of the execution status of the job corresponding to the stored setting history. In the third embodiment, validity of the setting history is determined for a job pertaining to image transmission on the basis of (1): whether a retransmission due to a transmission error has been performed for a specified number of times or more; (2) whether the job has been canceled; or (3) whether a destination associated with an address book has been edited or deleted, as the execution status of the job. The controller 11 which has determined that the setting history is not valid edits the setting history pertaining to the determination and then stores the edited setting history, or deletes the relevant setting history.

3.2 Flow of Processing

3.2.1 Flow of Overall Processing

Figure 17:
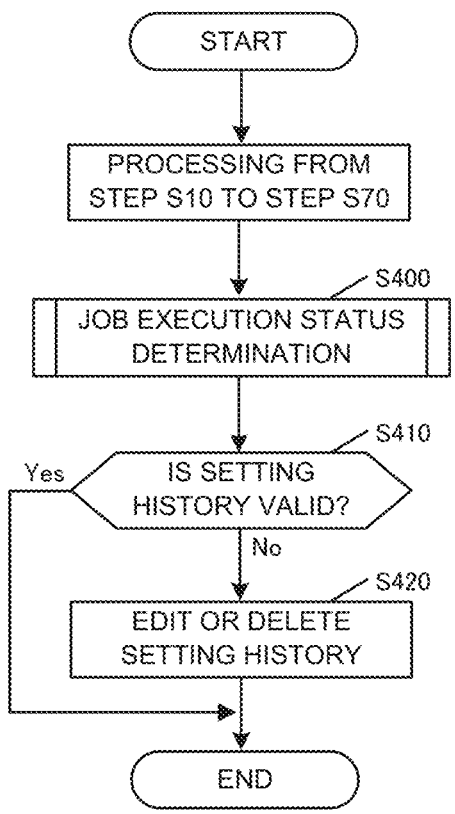
FIG. 17 is a flowchart illustrating a flow of processing according to the third embodiment.

Next, a flow of processing according to the third embodiment will be described. FIG. 17 is a flowchart illustrating overall processing performed by the multifunction peripheral 30. The processing described herein is processing executed by the controller 11 as the controller 11 reads the job execution program 231, the setting history processing program 232, the storage timing determination program 233, the display processing program 234, and the validity determination program 331.

Note that the processing according to the third embodiment can be performed after execution of the storage processing (steps S10 to S70) of storing the setting history described with reference to the flowchart of FIG. 5 of the first embodiment. FIG. 17 is presented for explanation assuming that the processing from step S10 to step S70 of FIG. 5 has been executed.

After the controller 11 has executed the processing related to step S10 to step S70, the controller 11 performs job execution status determination processing (step S400).

As a result of the job execution status determination processing, if it is determined that the setting history is valid, the controller 11 ends the processing without performing any processing for the setting history related to the job in question (step S410; Yes→"End").

Meanwhile, as a result of the job execution status determination processing, if it is determined that the setting history is not valid, the controller 11 edits the setting history related to the job in question and then stores the edited setting history or deletes the relevant setting history from the setting history storage area 236, and ends the processing (step S410; No→step S420→"End").

3.2.2 Flow of Job Execution Status Determination Processing

Next, the processing related to step S400 of FIG. 17 will be described referring to a flowchart of FIG. 18.

When the controller 11 starts the job execution status determination processing, the controller 11 determines whether the job in question corresponds to an image transmission job (step S4010).

If it is determined that the job corresponds to a job related to image transmission, the controller 11 determines whether the number of times retransmissions (retries) have been performed due to a transmission error is greater than or equal to a specified number (step S4010; Yes→Step S4020). Meanwhile, if it is determined that the job does not correspond to a job related to image transmission, the controller 11 performs validity determination of the setting history related to the other job types (e.g., a copy job or a fax job, etc.), and ends the processing (step S4010; No→Step S4070→"End"). If the validity determination of the setting history related to the other job types is not necessary, the controller 11 may directly end the processing.

If it is determined that the number of times retransmissions have been performed is greater than or equal to a specified number, the controller 11 determines that the setting history related to the job in question is not valid (step S4020; Yes→step S4060). If it is determined that the setting history is not valid, the controller 11 assumes that the destination pertaining to the image transmission is incorrect, and deletes only the destination from the corresponding setting history and then stores the setting history (step S420 of FIG. 17). When the destinations stored in the setting history turn out to be zero as a result of the deletion of the destination, the controller 11 may delete the setting history in question from the setting history storage area 236.

Meanwhile, if the number of times retransmissions have been performed is less than the specified number, the controller 11 determines whether the job in question has been canceled (step S4020; No→step S4030).

If it is determined that the job has been canceled, the controller 11 determines that the setting history related to the job in question is not valid (step S4030; Yes→step S4060). If it is determined that the setting history is not valid, the controller 11 assumes that there is some reason that the job in question should not be executed, and deletes the setting history from the setting history storage area 236 (step S420 of FIG. 17).

Meanwhile, if it is determined that the job has not been canceled, the controller 11 determines whether the destination associated with the address book has been edited on or after the setting history storage (step S4030; No→step S4040).

If it is determined that the destination associated with the address book has been edited, the controller 11 determines that the setting history related to the job in question is not valid (step S4040; Yes→step S4060). If it is determined that the setting history is not valid, in order to prevent erroneous transmission to an unintended destination, the controller 11 deletes only the destination from the corresponding setting history and then stores the setting history (step S420 of FIG. 17). When the destinations stored in the setting history turn out to be zero as a result of the deletion of the destination, the controller 11 may delete the setting history in question from the setting history storage area 236.

As the processing related to step S400 of FIG. 17, described above is a mode in which validity of a setting history related to a job pertaining to image transmission is determined, on the basis of processing performed in the order of (1) whether a retransmission due to a transmission error has been performed for a specified number of times or more; (2) whether the job has been canceled; and (3) whether a destination associated with an address book has been edited or deleted. However, the order of processing related to (1) to (3) above and the content of the processing are not particularly limited. For example, as the validity determination of the setting history, a mode of performing the processing of any one of the above (1) to (3) may be adopted, or processing obtained by combining any one of the above (1) to (3) may be performed. Further, the order of processing can be changed as appropriate.

As described above, according to the third embodiment, even if the setting history is one that is already stored, the setting history can be, for example, edited or deleted in accordance with the execution status of the job. By this feature, since the setting history related to a failed job is not maintained as history information, it is possible to prevent the failed job based on the relevant setting history from being repetitively performed.

The present disclosure is not limited to the embodiments described above, and various modifications can be made. That is, an embodiment obtained by combining technical means modified as appropriate without departing from the spirit of the present disclosure is also included in the technical scope of the present disclosure.

Further, although there are some parts in the above embodiments that are described separately for convenience of explanation, it is needless to say that the embodiments may be combined within the technically possible range and implemented.

In addition, the program to be operated on each of the devices in the embodiments is a program which controls the CPU or the like (i.e., a program which makes a computer function) so as to implement the functions of the above-described embodiments. Further, the information handled by these devices is temporarily accumulated in a temporary storage device (e.g., a RAM) at the time of processing the information, is then stored in various storage devices such as a read-only memory (ROM) and an HDD, and is read, corrected, and written by the CPU as needed.

Here, a recording medium that stores the program may be any of a semiconductor medium (for example, a ROM or a non-volatile memory card), an optical recording medium/magneto optical recording medium (for example, a digital versatile disc (DVD), a magneto optical disc (MO), a mini disc (MD), a compact disc (CD), or a Blu-ray (registered trademark) Disc (BD)), a magnetic recording medium (for example, a magnetic tape or a flexible disk), or the like. Further, not only are the functions of the above-described embodiments implemented by execution of the loaded program, but the functions of the present disclosure may also be implemented by processing performed in cooperation with an operating system or other application programs, etc., on the basis of the instructions of the program.

Furthermore, when the program is to be distributed to the market, the program may be stored in a portable recording medium for distribution or transferred to a server computer connected via a network such as the Internet. In this case, a storage device of the server computer is also included in the present disclosure as a matter of course.

What is claimed is:

1. An image processing apparatus comprising:
   a job executor which executes a job regarding image processing based on controls by one or more controller;
   a memory in which a setting history related to execution of the job is stored when the job is executed; and
   the one or more controller which controls a storage timing to store the setting history, wherein
   the one or more controller determines the storage timing based on an execution condition for the job, thereby storing the setting history, wherein
   the execution condition for the job is an input of an instruction to execute a second job, which is to be executed after execution of a first job that is based on an input of an instruction to execute the first job; and
   the one or more controller determines that a timing when the instruction to execute the second job is input is to be applied as the storage timing.

2. The image processing apparatus according to claim 1, wherein:
   the image processing apparatus applies an input of an instruction to end the job having been executed based on an input of an instruction to execute the job as the execution condition for the job; and
   the one or more controller determines that a timing when the instruction to end the job is input is to be applied as the storage timing.

3. The image processing apparatus according to claim 2, wherein the input of the instruction to execute the job is an input of an instruction to start reading a document, and the input of the instruction to end the job is an input of an instruction to end reading the document.

4. The image processing apparatus according to claim 1, wherein the input of the instruction to execute the first job is an input of an instruction to start reading a document, and the input of the instruction to execute the second job is an input of an instruction to start the image processing selected from one of image formation, image transmission, and image saving.

5. The image processing apparatus according to claim 1, wherein the first job is the job related to a tentative operation of the second job.

6. The image processing apparatus according to claim 1, wherein the one or more controller determines that a timing when an instruction to confirm the second job is input between the input of the instruction to execute the first job and the input of the instruction to execute the second job is to be applied as the storage timing.

7. The image processing apparatus according to claim 5, wherein the one or more controller stores the setting history related to the first job each time the first job is executed.

8. The image processing apparatus according to claim 1, wherein the one or more controller edits or deletes the setting history based on an execution status of the job.

9. A method of storing a setting history comprising:
   storing a setting history related to execution of a job when the job is executed; and
   controlling a storage timing to store the setting history, wherein
   the controlling determines the storage timing based on an execution condition for the job, thereby storing the setting history, wherein
   applying an input of an instruction to execute a second job, which is to be executed after execution of a first job that is based on an input of an instruction to execute the first job, as the execution condition for the job; and
   the controlling determines that a timing when the instruction to execute the second job is input is to be applied as the storage timing.

* * * * *